Jan. 23, 1968　　　　　J. C. ADAMS　　　　　3,364,586
DRYER CONTROL
Filed May 9, 1966　　　　　　　　　　　　　　　4 Sheets-Sheet 1
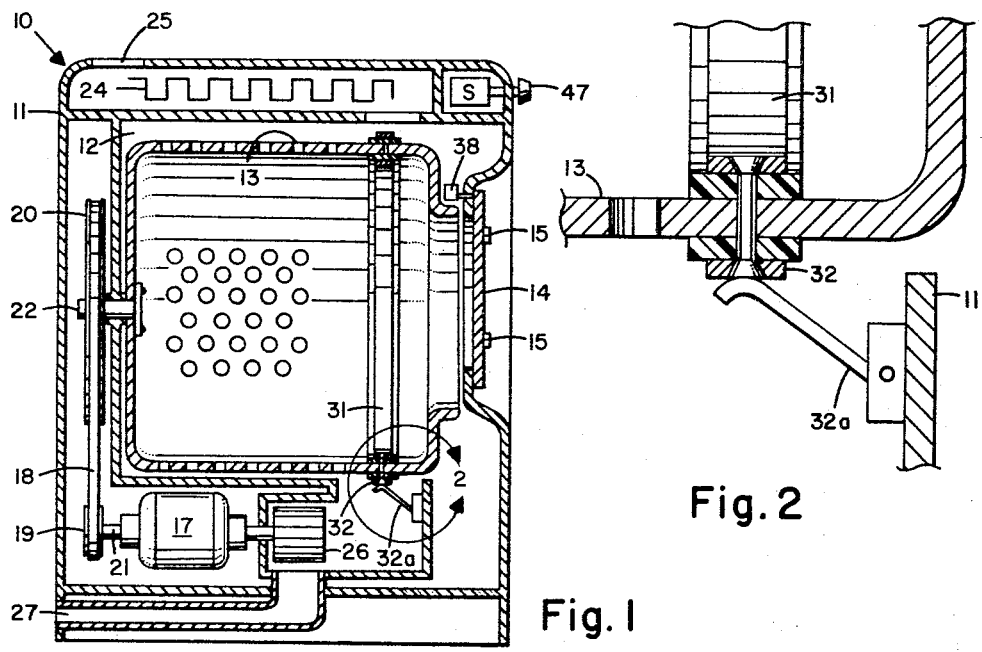
Fig. 2
Fig. 1
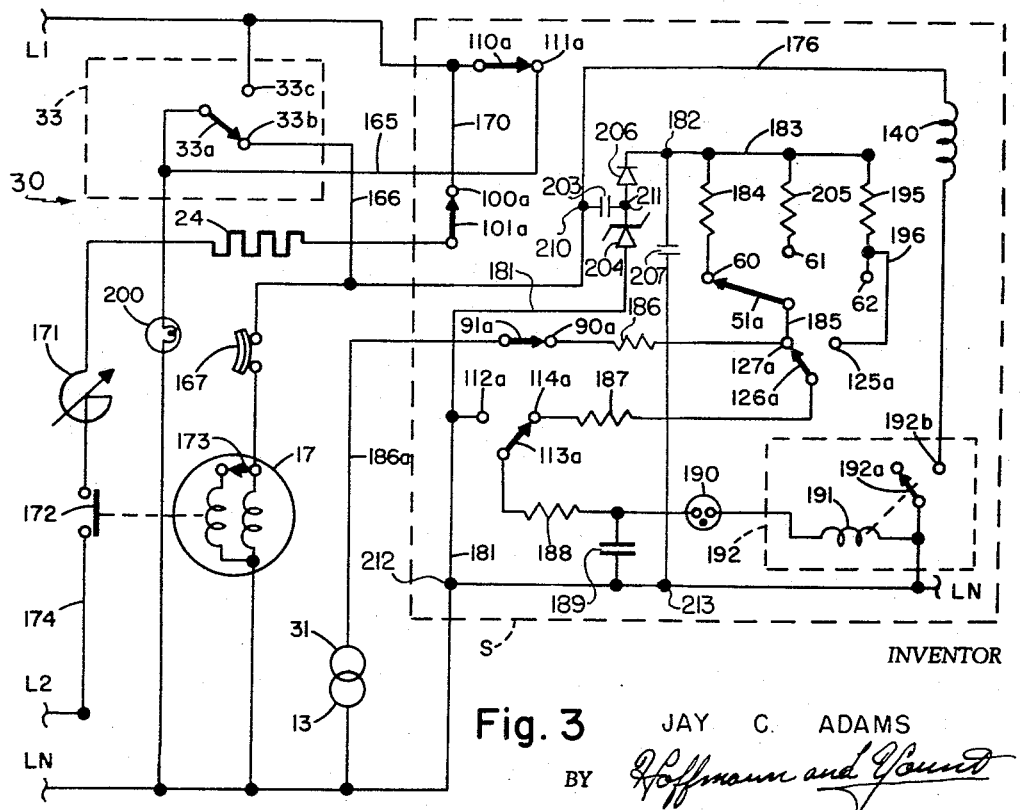
Fig. 3
INVENTOR
JAY C. ADAMS
BY Hoffmann and Yount
ATTORNEYS

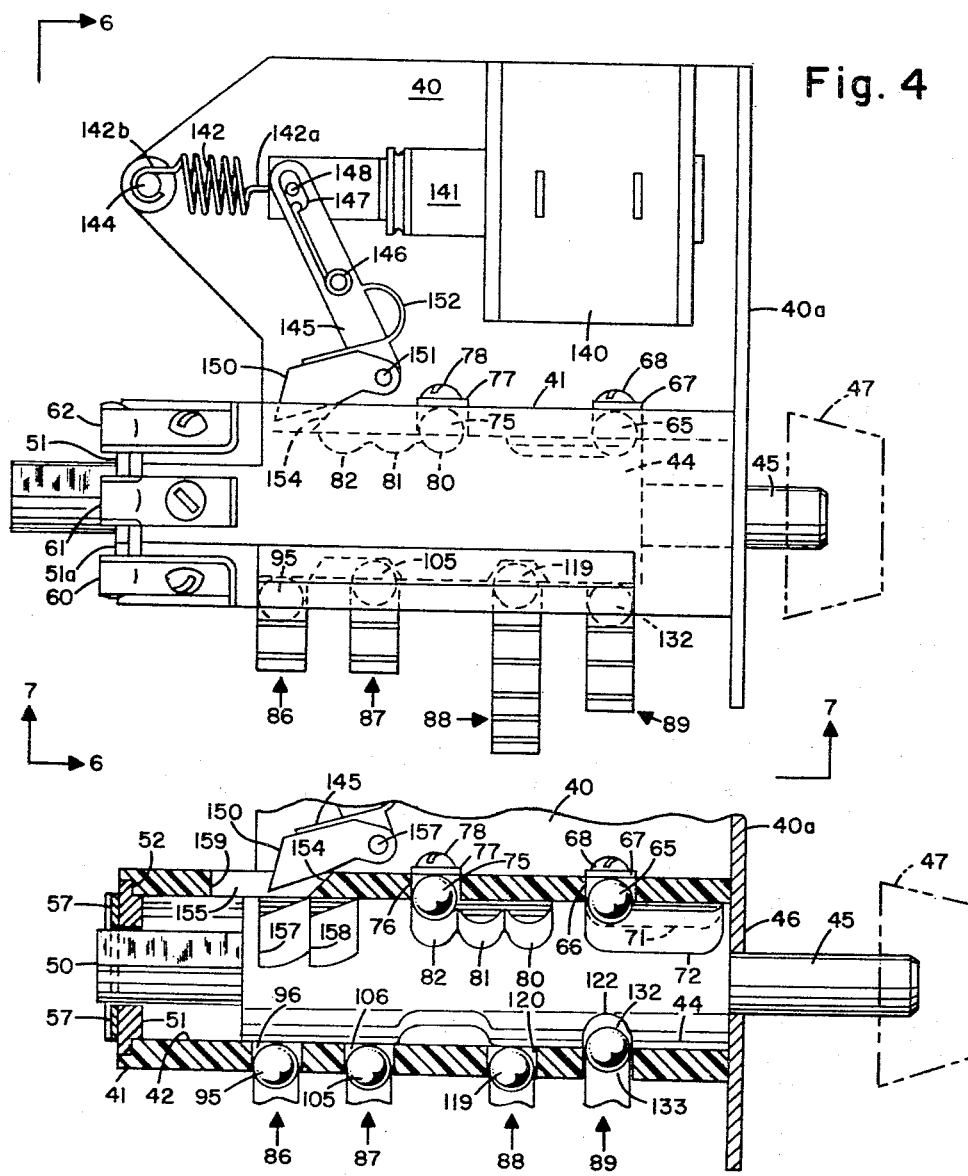
Jan. 23, 1968     J. C. ADAMS     3,364,586
DRYER CONTROL
Filed May 9, 1966     4 Sheets-Sheet 2
Fig. 4
Fig. 5
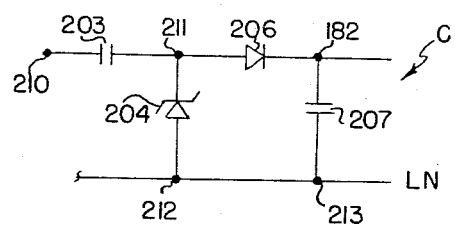
Fig. 11
INVENTOR
JAY C. ADAMS
BY *Hoffmann and Young*
ATTORNEYS INVENTOR
JAY C. ADAMS
BY Hoffmann and Yount
ATTORNEYS Jan. 23, 1968   J. C. ADAMS   3,364,586
DRYER CONTROL Filed May 9, 1966   4 Sheets-Sheet 4

INVENTOR
JAY C. ADAMS
BY *Hoffmann and Yount*
ATTORNEY

United States Patent Office 3,364,586
Patented Jan. 23, 1968

3,364,586
DRYER CONTROL
Jay C. Adams, Columbus, Ohio, assignor to Ranco Incorporated, Columbus, Ohio, a corporation of Ohio
Filed May 9, 1966, Ser. No. 548,771
7 Claims. (Cl. 34—45)

The present invention relates in general to controls and more particularly relates to electrical control circuitry operative to perform a control function in an apparatus such as a clothes dryer.

In an apparatus such as a household clothes dryer, circuitry has been provided for controlling the operation of the drying apparatus in response to the moisture in the clothes being dried therein. The control circuitry for sensing the moisture in the clothing and controlling the operation of the drying apparatus in response thereto is normally supplied by household electrical current; that is, 60 cycle 110 volt, or 60 cycle 220 volt electrical power. In many cases the supply of electrical power is subject to fluctuations such as surges in voltage due to changes in load on power plants and such fluctuations or surges are apt to cause a control function to be performed by apparatus control circuitry which is a false indication of a non-existant condition to which the circuitry is designed to respond.

Accordingly, a principal object of the present invention is the provision of a new and improved electrical control circuit supplied with voltage substantially greater than the peak of an alternating current power source and isolated from fluctuations in voltage peaks of the power source to provide highly sensitive reliable and accurate control functions substantially unaffected by variations in the source voltage.

Another object of the present invention is the provision of a new and improved voltage doubler circuit arrangement operative to rectify voltage from an alternating current power source and substantially increase the value of the rectified voltage over that of the peak source voltage and which includes a semiconductor element having a breakdown voltage less than twice the peak voltage value of the source, the breakdown voltage of the element determining the maximum output voltage of the voltage doubler and which is so constructed and arranged that normal fluctuations in the source peak voltage do not affect the output voltage of the doubler circuit.

Another object of the present invention is the provision of a new and improved drying apparatus having an electrical control circuit controlling operation of the drying apparatus in response to moisture content in material being dried and in which the voltage of power supplied to the control is substantially increased to a generally constant operating voltage for the control and which is so constructed and arranged that the operating voltage of the control is unaffected by substantial fluctuations in the voltage of the power source above normal.

Another object of the present invention is the provision of a new and improved drying apparatus having an electrical control circuit controlling operation of the drying apparatus in response to changes in conductivity of material, such as clothing, being dried due to changes in moisture content thereof and including circuit elements forming a voltage doubler circuit for rectifying and substantially increasing in voltage from an alternating current power source to the control circuit, the voltage doubler circuit including a semiconductor having a breakdown voltage smaller than twice the peak voltage of the power source and which is so constructed and arranged that normal fluctuations in the power source do not affect the control circuit voltage.

Other objects and advantages of the invention will become apparent from the following description of a preferred embodiment thereof, read in conjunction with the accompanying sheets of drawings forming a part of this specification, and in which:

FIG. 1 is a vertical sectional illustration of a clothes dryer embodying control means of this invention;

FIG. 2 is an enlarged fragmentary sectional view taken within circular line 2 of FIG. 1;

FIG. 3 is a schematic illustration of a control circuit embodying this invention;

FIG. 4 is a plan view of a function selector switch device forming a part of the control circuit;

FIG. 5 is a fragmentary sectional view of the control switch of FIG. 4;

Figure 7:
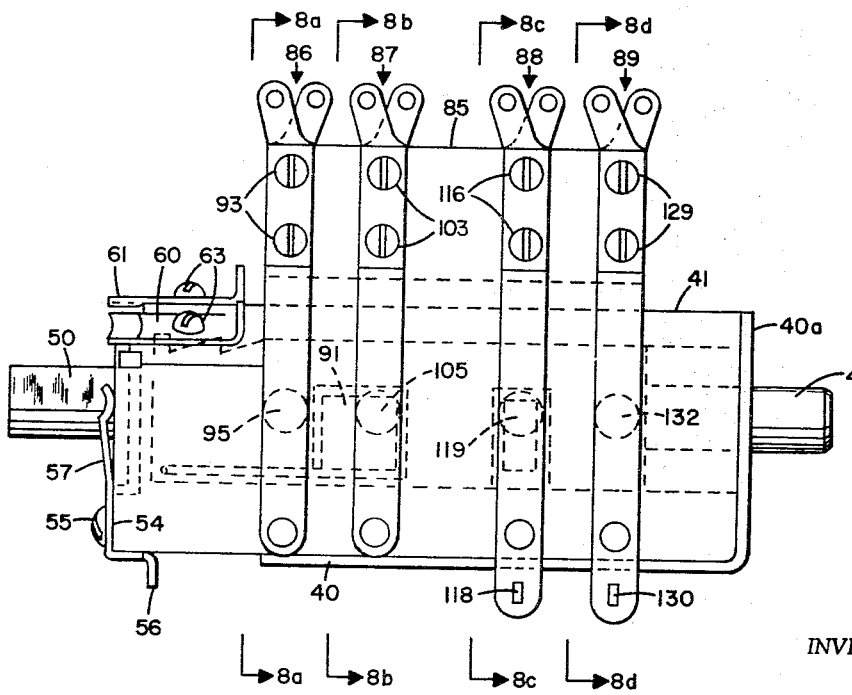
FIG. 7 is a side elevational view of the control switch as viewed along line 7—7 of FIG. 4.
Figures 9, 10:
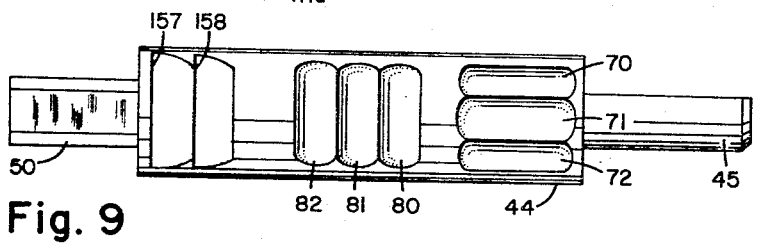

FIGS. 8a, 8b, 8c and 8d are sectional views on a reduced scale taken substantially along the respective section lines 8a—8a, 8b—8b, 8c—8c, and 8d—8d of FIG. 7;

FIG. 9 is a top elevational view of a cam member forming part of the control switch;

FIG. 10 is a bottom elevational view of the cam member; and

FIG. 11 is a schematic view of a part of the circuit of FIG. 3.

In the drawings, there is illustrated an example of a conventional domestic clothes dryer 10 of a type with which the invention may be used to advantage. The dryer 10 comprises a cabinet 11 having an inner chamber 12 in which is rotatably supported a perforate drum 13. The drum 13 may be loaded with clothes to be dried through an access door 14 which is hinged at 15 to the cabinet 11.

Rotation of the drum 13 is effected by a drive motor 17 which is operably connected to the drum through suitable transmission means such as a belt 18 and pulleys 19 and 20 which are secured on the motor and drum shafts 21 and 22, respectively. Heating means, such as an electrical resistance type heater 24, or its equivalent, is provided to heat air drawn through an intake opening 25, over the heater 24, into the chamber 12, through the drum 13 and out an exhaust duct 27 by a suitable blower or fan 26 which is conveniently driven by the motor 17.

Energization of the motor 17 and of the heater 24 is controlled by a control circuit 30 (FIG. 3) including a function selector switch generally indicated at S in FIGS. 1 and 3. The function selector switch S is provided with a control knob 47 which may be manually rotated by the operator to any of three positions to select any one of three operating modes, namely, "dry," "damp dry," or "air fluff." When this selection has been made, the knob 47 is pulled out to start the operation of the dryer 10.

In the case of dry or damp dry, air drawn through the rotating drum 13 is heated by the heater 24 until the clothes are dry or damp dry as sensed by clothing moisture sensing means forming part of the circuit 30. In this example the clothing moisture sensing means comprises the metal clothes drum 13 as one conductive sensor element, and a second conductive sensor element 31 which is conveniently in the form of a band disposed within the drum 13 and electrically insulated therefrom as is best shown in FIG. 2. The sensor element 31 is electrically connected to a slip ring 32 mounted about the drum 13 for rotation therewith, and is in sliding contact with a suitable brush 32a supported by the frame 11. The drum 13 and the other sensor element 31 are in close, predetermined spaced relation and when they are bridged by an article, such as cloth, the moisture, if any, in the cloth forms an electric path therebetween and the resistance of the path is inversely proportional to the amount of moisture present. When the clothes have reached their degree of dryness, the control circuit automatically terminates the energization of the heater 24 but maintains energization of the motor 17 for a predetermined cooling down period during which air to room temperature is drawn through the drum 13. At the end of the cooling down period the motor 17 is de-energized, terminating operation of the dryer 10 automatically.

In order to permit safe inspection of clothes in the dryer or addition or removal of clothes therefrom during the drying process, a door operated switch 33 is provided which interrupts energization of the heater 24 and the motor 17 upon opening of the door 14.

Referring now to FIGS. 4–7, the function selector switch S comprises a base plate 40 which is conveniently formed of sheet metal or the like, and comprises a flange 40a extending along one edge thereof. Mounted on the base plate 40 is an elongated switch body 41 having a cylindrical bore 42, the axis of which extends normal to the flange 40a. Rotatably and reciprocably disposed in the bore 42 of the body 41 is a generally cylindrical cam member 44 having at one end an operating stem 45. The stem 45 extends through an opening 46 in the flange 40a and has secured thereon the knob 47.

Figure 6:
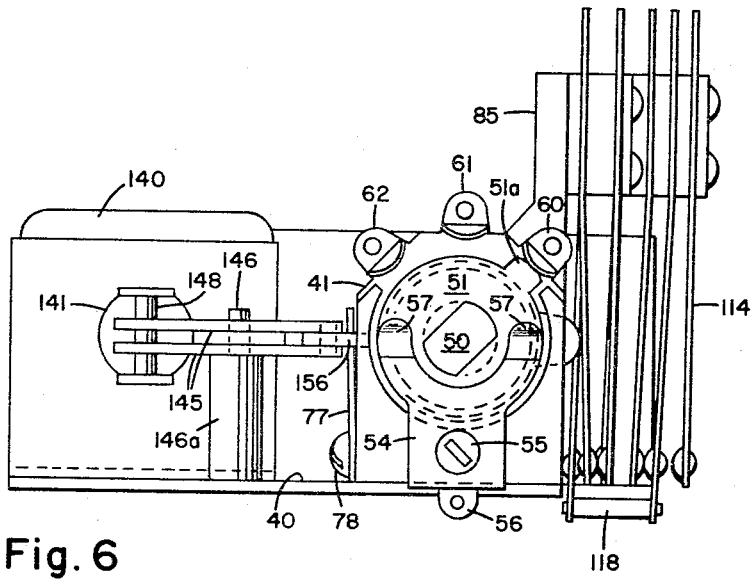
FIG. 6 is an end view of the control switch as viewed along line 6—6 of FIG. 4.

A shaft 50 of noncircular cross section extends from the other end of the cam member 44 and through a complementary opening in a disc-like contact member 51 having a contactor lug 51a on the periphery thereof. The contact member 51 is rotatably seated in a counterbore 52 of the switch body 41 and is retained therein by a resilient wiper member 54 which is best illustrated in FIG. 6. The wiper member 54 is secured to the body 41 by a screw 55 and is conveniently formed of a conductive spring metal such as beryllium copper having at one end an electrical terminal connection 56 and at the other end a pair of arcuate fingers 57 bearing against the rotatable contact member 51. The noncircular shaft 50 and complementary opening in the member 51 permits axial movement of the cam member in bore 42 and connects the member 51 to the cam member for rotation therewith irrespective of the axial position of the cam member.

The cam member 44 is rotatable by means of knob 47 between three positions for selecting the previously mentioned drying functions, e.g., "dry," "damp dry," or "air fluff," as is more fully described hereinafter. Because of the noncircular configuration of shaft 50, the contact member 51 is rotatable with the cam member between three positions whereby the contactor lug 51a is selectively engageable with each of three electrical contacts 60, 61 and 62 which are secured by screws 63 to the switch body 41. Cam member 44 is frictionally retained in each of its three rotative positions corresponding to engagement of the contact member 51 with contacts 60, 61 or 62, by detent means comprising a ball 65 movably disposed in opening 66 in the switch body 41 and biased inwardly of the bore 42 by a leaf spring 67 which is secured to the body 41 by a screw 68. The ball 65 is cooperable with three grooves 70, 71 and 72 formed in the cam member 44 to retain the cam member and the contactor lug 51a in selected ones of their three rotative positions, while permitting the cam member 44 to be reciprocated in the bore 42 to any of three axial positions including a left-hand position illustrated in FIG. 4, an intermediate position, and a right-hand position illustrated in FIG. 5.

Detent means are provided for retaining the cam member 44 in any of these three positions or reciprocation, and comprise a detent ball 75 movably disposed in an opening 76 in the body 41 and pressed inwardly of the bore 42 by a leaf spring 77 which is secured to the body by a screw 78. The ball 75 is cooperable with three grooves 80, 81 and 82 in the cam member 44 to retain the cam member in any one of its three axial positions.

Mounted on the end of an arm 85 of the switch body 41 are four switch blade groups 86, 87, 88 and 89, which are actuated by movement of the cam member 44. The group 86, best illustrated in FIG. 8a, comprises resiliently flexible spring metal conductive switch blades 90 and 91 which are separated by an insulator 92 and are secured to the body arm 85 as by screws 93. The blades 90 and 91 carry contacts 90a and 91a which tend to be separated by the inherent resiliency of the switch blades. A ball 95 is movably disposed in an opening 96 of the switch body 41 and cooperates with the cam member 44 to control closing and opening of the contacts 90a, 91a. In this regard, the cam member 44 comprises an L-shaped recess 97 (FIG. 10) into which the ball 95 may move to permit opening of the contacts 90a, 91a in certain predetermined positions of the cam member.

Figure 8A:
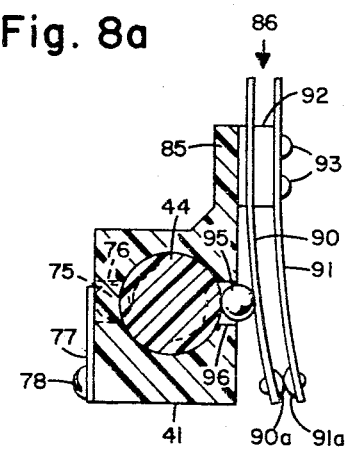
Figure 8B:
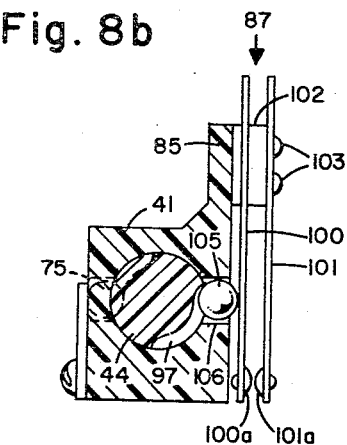

The second group 87 of switch blades, as seen in FIG. 8b, comprises spring blades 100 and 101 separated by an insulator block 102 and secured by screws 103 to arm 85 of the body 41. The blades 100 and 101 carry contacts 100a and 101a, which are normally separated by the blades and opening and closing movements of which are controlled by a ball 105 which is movably disposed in an opening 106 of the body member. The ball 105, like ball 95, is actuated by the walls of recess 97 so as to move outwardly or inwardly and cause closing and opening of the contacts 100a, 101a, respectively, in accordance with predetermined positioning of the cam member 44.

Figure 8C:
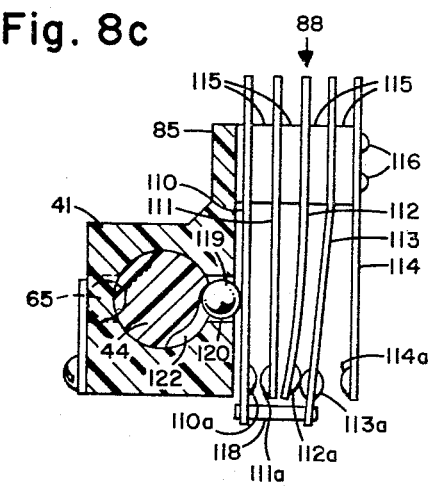

The switch blade group 88, as shown in FIG. 8c, comprises blades 110, 111, 112, 113 and 114, separated by insulator blocks 115 and secured to the switch body arm 85 as by screws 116. These blades carry contacts 110a, 111a, 112a, 113a and 114a, respectively. Blades 110 and 113 are interconnected by an insulating spacer 118 so as to be moved in unison by a ball 119 which is movably disposed in an opening 120 in the switch body 41 and is moved by the camming action of the walls of a recess 122 (FIG. 10) in the cam member 44 when the cam member is shifted axially. When the cam 44 is positioned with the ball 119 in the recess 122, the contacts 112a, 113a are closed by the bias of blades 110 and 113 while contacts 110a, 111a and 114a are opened. Conversely, when the cam member 44 is positioned so that ball 119 is displaced from recess 122, the ball moves blades 110 and 113 to the right, as viewed in FIG. 8c so that contacts 112a, 113a are opened, while contacts 110a, 111a and 113a, 114a are closed.

Figure 8D:
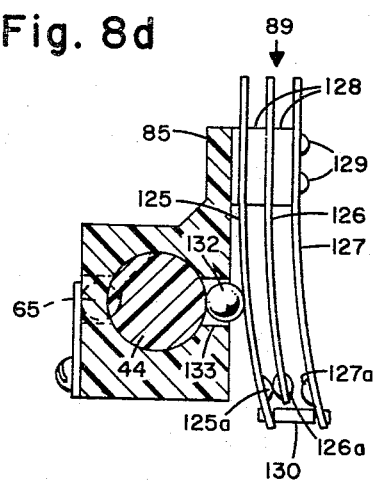

As seen in FIG. 8d, the switch blade group 89 comprises switch blades 125, 126 and 127 separated by insulator blocks 128 and secured as by screws 129 to the arm 85 of switch body 41. Blades 125, 126 and 127 carry contacts 125a, 126a and 127a, respectively and blades 125 and 127 are interconnected by an insulating spacer 130 to be moved in unison and these blades are biased to close contacts 126a and 127a and open 125a and 126a. The blades 125 and 127 are moved in unison to the right to close contacts 125a, 126a and open contacts 126a, 127a by a ball 132 which is movable disposed in an opening 133 in the switch body 41 and which is shifted into and out of recess 122 when the cam member is reciprocated to and from its extreme right-hand position.

The control switch S further comprises means for stepping the cam member 44 from its right-hand or "operate" position to the intermediate or "cool down" position, and then to its left hand or "off" position. To this end there is provided actuator means comprising a solenoid 140 having an armature 141, the solenoid being mounted on the base plate 40 and forming part of the circut 30. The armature 141 is normally biased to its illustrated extended position by a spring 142 having one end 142a connected to the armature and the other end thereof anchored by a post 144 on the base plate.

A lever 145 is pivoted to a post 146 on the base plate 40, and is provided at one end with a slot 147 slidably receiving a pin 148 carried by armature 141. On the other end of lever 145 there is a pawl 150, pivoted thereto as at 151. The pawl 150 is biased by a spring 152 into engagement with a cam surface 154 at one end of an opening 155 communicating with a bore 42 of switch body 41. The opening 155 is aligned with ratchet grooves having shoulders 157, 158 formed in the surface of cam member 44.

When the cam member is in extreme right-hand position with ball 75 seated in groove 82, energization of the solenoid 140 to retract armature 141 will cause the pawl 150 to be extended through the opening 155 into engagement with shoulder 157 and to drive the cam member to an intermediate position with ball 75 seated in groove 81. The stroke of pawl 150 is limited by the end surface 159 of opening 155. When the solenoid 140 is de-energized, the pawl is retracted and rides onto a cam surface 154 and clear of the cam member 44. A subsequent energization of the solenoid 140 will extend the pawl 150 into engagement with shoulder 158 and drive the cam 44 to its left-hand position, with ball 75 seated in groove 80. Again, upon de-energization of solenoid 140, the pawl 150 will be retracted clear of the cam member 44.

Assuming the operator wishes to perform a drying operation on wet clothes in the drum 13 of dryer 10, the cam member 44 is rotated by control knob 47 to bring contact 51a in engagement with contact 60 with ball 65 seated in groove 70, and then knob 47 is pulled out to shift the cam member 44 to the right in bore 42 until detent ball 75 seats in groove 82. These movements of cam member 44 cause the balls 95, 105, 119 and 132 to move their associated switch blade contacts from the "off" positions illustrated in FIGS. 8a–8d to the operating positions illustrated in the circuit diagram of FIG. 3.

When the knob 47 is pulled out, the contacts 110 are closed, completing energization circuits for the motor 17 and for the control circuitry associated with the function selector switch S. The energization circuit for the motor 17 may be traced from the line L1 through the contacts 110a, closed contacts of the door switch 33, a motor protector 167, the motor 17 and to the neutral ground line Ln. The energization circuit for the circuitry associated with the function selector switch S may be traced from the line L1 through the contacts 110a, the door switch 33, through the function selector switch circuitry, and back to the neutral ground line Ln. Closing the contacts 101 permits energization of the heater 24 as will be presently described.

The motor 17 is energized to drive the drum 13 and fan 26, as well as to close the contacts 172 completing an energization circuit for the heater 24. The energization circuit for the heater 24 may be traced from the line L1 through the contacts 100a, 101a, the heater 24, thermostat 171, and contacts 172 to the power line L2.

The energization circuit for the function selector switch S includes a rectifying voltage doubler generally indicated at C, described in detail hereinafter, which provides a source of direct current potential across junctions 182 and 212 between the switch S and the power source. Completion of the energization circuit as described hereinbefore establishes a moisture responsive voltage divider circuit from the junction 182, through a resistor 184, contact 51a, resistor 186, contacts 90a, 91a, the sensor 31 and drum 13 to the line Ln, this circuit including, of course, any more or less conductive material such as moist clothing bridging the sensor 31 and drum 13.

It will be seen that the voltage at contact 127a will increase with increases in resistance in the resistance path through clothes bridging the sensor 31 and the drum 13 as the clothes dry. The contact 127a is connected by contact 126a and resistor 187, contacts 114a, 113a, a resistor 188 and a capacitor 189 to the ground line Ln. It will also be seen that the voltage across the capacitor 189 will increase in accordance with increases in electrical resistance of clothes being dryed in the drum 13.

Connected in series across the capacitor 189 are a neon bulb 190, or an equivalent voltage controlled conductor such as a voltage regulating gas filled discharge tube, and a solenoid 191 of a relay 192 having normally open contacts 192a and 192b. The values of resistances 184, 186, 187, 188, capacitor 189, and the firing voltage of neon bulb 190 are so chosen that when the clothes are dried to a predetermined degree of dryness, the increased resistance of the clothes will result in a voltage across the capacitor 189 which exceeds the firing voltage of the neon bulb 190 which will become conductive and energize relay solenoid 191. Energization of the relay solenoid 191 effects closing of the contacts 192a, 191b, thereby completing a circuit from the power line L1 through contacts 110a, 111a, the door switch 33, conductors 166, 176, stepping solenoid 140, and the contacts 192a, 192b to the ground line Ln.

Energization of the stepping solenoid 140 causes the pawl 150 to shift the cam member 44 from its right-hand position to its intermediate position with detent ball 75 engaged in groove 81. This movement of the cam member 44 effects opening of contacts 100a, 101a to de-energize heater 24. In addition the cam member movement effects opening of contacts 90a, 91a, opening of contacts 126a, 127a, and closing of contacts 126a, 125a, to terminate the moisture responsive character of the circuit and condition it to perform a time delay function in determining a cooling off period during which unheated air is drawn through the drum 13.

When the circuit 30 is so conditioned, a circuit may be traced from the junction 182 through conductor 183, a resistor 195, conductor means 196, contacts 125a, 126a, resistor 187, contacts 113a, 114a, and resistor 188 to capacitor 189. The just mentioned resistors are to chosen that a predetermined time period will elapse before the capacitor 189 is charged to a voltage sufficient to fire the neon bulb 190. This predetermined period, which may be on the order of a number of minutes, permits the unheated air being drawn through the drum 13 to cool the clothes and drum to a temperature which is comfortable for handling.

At the end of the cooling off period, when the capacitor 189 has charged sufficiently to fire neon bulb 190, the solenoid 191 is again energized closing contacts 192a, 192b and energizing actuator stepping solenoid 140. Energization of the solenoid 140 causes the pawl 150 to shift the cam member from its intermediate position to its left-hand position with the detent ball 75 engaged in detent groove 80. This movement of the cam member 44 returns the contacts of switch S to the positions illustrated in FIGS. 4 and 8, thereby terminating energization of the motor 17.

The drum 13 is conveniently provided with a lamp 200 which may or may not be of the germicidal type, and which, during operation of the dryer 10, is lighted by virtue of its connection between conductor 165 and power line Ln. In order to provide illumination for the drum 13 when loading or removing clothing, opening of the door closes door switch contacts 33a, 33c and lamp energizing current flow directly from power line L1 through the lamp 200 to the power line Ln. Although closing of contacts 33a, 33c effectively by-passes contacts 110a, 111a, there will be no charging of the capacitor 189 or firing of the neon bulb 190, since movement of the cam member 44 to the off position opens contacts 113a, 114a, and closes contacts 113a, 112a to remove any charge which may remain on the capacitor 189.

When it is desired to dry a load of clothes only to a damp dry state in preparation for subsequent ironing, the control knob 47 is turned by the operator to rotate the cam member 44 into a position wherein detent ball 65 is engaged in groove 71, and contactor member 51 is positioned with contact 51a engaging the contact 61, which action substitutes a resistor 205 in the voltage divider circuit in place of resistor 184. The value of the resistor 205 is lower than that of resistor 184 and is such that the firing voltage for the neon bulb 190 is reached when the moisture sensing means 31, 13 sense a degree of dryness in the clothes which is suitable for ironing, usually referred to as "damp dry" and more moist than when resistor 184 is in the circuit. Upon firing of the neon bulb 190, the relay solenoid 191 is energized to effect energization of stepping solenoid 140, and the cam member 44 is stepped to its intermediate position, terminating the drying cycle and initiating a cooling off period as described hereinbefore.

In some instances it is desirable to operate the clothes dryer without heating the air being drawn through the drum 13 for air fluffing bedding or freshening garments. To accomplish this, the knob 47 is rotated to the "air fluff" position in which the cam member 44 is positioned with the detent ball 65 engaged in groove 72, and the contact 51a is in conductive engagement with contact 62. After the clothes are loaded in the drum 13, the knob 47 is pulled to shift the cam member to its operate position in which detent ball 75 is engaged in groove 82 to initiate operation of "air fluff" cycle. Rotation of the cam member 44 to the air fluff position opens the contacts 90a, 91a and opens contacts 100a, 101a, which contacts remain open while contacts 110a, 111a are closed to energize the drum and fan operating motor 17. Because the contacts 90a, 91a, remain open, and contactor 51a engages contact 62, the time required to charge capacitor 189 to a voltage sufficient to fire neon bulb 190 will be determined by the values of resistors 195, 187 and 188. By making the resistance of resistors 195 sufficiently large, a substantial time period will be required before the neon bulb 190 fires to energize relay solenoid 191 and close contacts 192a, 192b for energization of stepping solenoid 140 which shifts the cam member to its intermediate position with detent ball 75 engaged in groove 81. This movement of the cam member opens contacts 126a, 127a, and closes contacts 126a, 125a while leaving the other switch contacts in their aforementioned positions and, because the capacitor 189 has been discharged through the neon bulb 190, a second time period will be required to recharge the capacitor to a voltage which will again fire the neon bulb 190 to effect operation of relay 192, and stepping of the cam member to its off position to terminate the air fluff cycle.

In accordance with the present invention, the control circuitry associated with the function selector switch S is isolated from fluctuations in voltage peaks of the power source. To this end a voltage doubling rectifier circuit C is provided between the power source and the function selector circuitry. The voltage doubler circuit C is diagrammatically illustrated in FIGS. 3 and 11 and is operative to rectify voltage from the alternating current power source and substantially increase the value of the rectified voltage over that of the peak source voltage and is constructed so that normal fluctuations in the peak voltage of the source are not transmitted through the voltage doubler circuit to the function selector switch control circuit.

As shown schematically in FIG. 11, the circuit C comprises a capacitor 203 connected in series with a circuit arrangement including a Zener diode 204, a diode 206 and a capacitor 207. The capacitor 203 is connected between the line L1 and the above mentioned circuit arrangement by way of switches 110a, 33a, conductor 176, a junction 210 and a junction 211. The Zener diode 204 is connected between the junction 211 and a junction 212 connected to the line Ln. The diode 206 is connected between the junction 211 and the junction 182, while the capacitor 207 is connected between the junction 182 and a junction 213 connected to the line Ln. It will be appreciated that a 110 volt alternating current potential will exist across the terminals 210, 212 when the dryer is operating. When the voltage at the junction 212 is positive with respect to the voltage of the junction 210, the capacitor 203 is charged to the peak voltage of the source line current as a result of a forward bias applied to the Zener diode 204. When the voltage at the junction 210 is positive with respect to the voltage at the junction 212 the capacitor 203 discharges and adds to the peak voltage applied across the junctions 210, 212 resulting in a potential across the junctions 182, 213 of twice the peak voltage of the source.

The Zener diode 204 has a Zener voltage which corresponds to a value somewhat less than twice the value of the normal peak voltage of the source. The Zener voltage is preferably about 10 percent less than twice the normal peak voltage and in the present instance, for example, could be approximately 200 volts. When the junction 210 becomes positive with respect to the junction 212 and the capacitor 203 discharges, the discharge voltage of the capacitor 203 and the voltage from the source add to produce a voltage approximately twice the voltage applied from the source as described. This voltage will be in the neighborhood of 220 volts so that approximately 220 volts potential will exist between the junctions 211 and 212 of the doubler circuit C. When a voltage in excess of the breakdown voltage of the Zener diode 204 exists between the junctions 211 and 212, the Zener diode conducts in a reverse direction with extremely low resistance to bleed off voltage in excess of the Zener voltage and effectively regulate the maximum voltage applied across the junctions 211, 212. When the voltage at the junction 211 is positive with respect to the junction 212, the diode 206 is biased forwardly to complete a circuit through the function selector switch control circuitry. When the diode 206 is forwardly biased, a voltage corresponding to the Zener voltage of the diode 204 exists across the junctions 182 and 213, charging the capacitor 207 to that voltage. On the next alternation of current from the source the capacitor 207 discharges through the function selector switch control circuitry to provide a voltage output corresponding to the Zener voltage of the diode 204. The effect of the circuit is then a direct voltage output corresponding to the Zener voltage of the Zener diode 204.

Thus, it will be seen that by proper selection of the Zener voltage of the diode 204 the control circuitry may be isolated from above normal fluctuations in the voltage of the power source due to the regulating effect of the Zener diode in the doubler circuit C. It will be also be seen that utilization of such a regulating doubler circuit provides for increased accuracy of control circuitry due to regulation of the variations in the source voltage.

Although the invention has been described in considerable detail with reference to a particular type of apparatus having a control circuit embodying the present invention, it will be understood that the invention is not limited to this apparatus, but rather the invention includes all adaptations, modifications, substitutions and uses as are reasonably embraced by the scope of the claims hereof.

Having described my invention, I claim:

1. In a control circuit including circuit elements for performing a control function in response to voltage changes effected by changes in conditions being controlled, circuit means for increasing and regulating voltage of an AC source supplied to said control circuit, said circuit means including a capacitor and a semiconductor element having a low resistance to current flow in one direction and a high resistance to current flow in an opposite direction at voltages below a predetermined voltage and a low resistance to current flow in said opposite direction at voltages above said predetermined voltage, said semiconductor element orientated with respect to said capacitor to charge said capacitor to the peak value of said source potential during an alternation of said source potential, said capacitor discharging on a subsequent alternation of said current to provide a potential in excess of said source voltage, said conductive element operative when said potential is greater than said predetermined voltage to conduct in said opposite direction to limit said potential to the value of said predetermined voltage, said limited potential being supplied to said circuit elements and said circuit elements being isolated from fluctuations in voltage peaks in said source voltage.

2. A control circuit as defined in claim 1 and further including a second capacitor, charged to said limited potential when said first capacitor discharges, said second capacitor discharging on a subsequent alternation of said source voltage to said circuit elements to provide a direct voltage to said circuit elements.

3. An apparatus as defined in claim 2 and further including a second conductor element having a low resistance to current flow in one direction and a high resistance to current flow in said opposite direction, said second conductor element operable to conduct said limited potential therethrough to said circuit elements and said second capacitor and operative to prevent discharge of said second capacitor therethrough in said opposite direction on a subsequent alternation of said source voltage.

4. An apparatus as defined in claim 1 and further including a second conductor element having a low resistance to current flow in one direction and a high resistance to current flow in said opposite direction, said second conductor element operable to conduct said limited potential therethrough to said circuit elements and operative to prevent current flow therethrough in said opposite direction on a subsequent alternation of said source potential.

5. A dryer control circuit for effecting a control function in response to a predetermined degree of dryness of articles, said circuit comprising moisture sensing means including a conductive element having a resistance which changes in response to changes in article dryness, a second resistance connected with said first resistance across a source of direct current voltage to form a voltage divider having an output which varies with changes in moisture content of articles, circuit elements connected to a source of alternating potential and operable to provide a direct voltage and including a semiconductor element having a low resistance to current flow in one direction and a high resistance to current flow in an opposite direction at voltages below a predetermined voltage and a low resistance to current flow in said opposite direction at voltages above said predetermined voltage, and a capacitor associated with said semiconductor elements and charged upon conduction of said semiconductor in said one direction, said capacitor discharging on a subsequent alternation of said alternating source voltage to provide a potential having a peak value substantially greater than the peak value of the voltage of said source, said semiconductor element operative when said potential peaks exceed said predetermined voltage to limit the value of the potential to that of said predetermined voltage to regulate the potential supplied to said resistance divider, and switch means operative in response to a predetermined output of said resistance divider to effect a control function of said dryer control circuit.

6. An apparatus as defined in claim 5 wherein said circuit elements further include a second capacitor charged to said predetermined voltage during a subsequent alternation of source current and discharging thereafter to provide a direct voltage to said voltage divider.

7. An apparatus as defined in claim 6 and further including a second semiconductor element having a low resistance to current flow in one direction and a high resistance to current flow in an opposite direction and operative when said second capacitor discharges to prevent discharge of said second capacitor therethrough in said opposite direction.

No references cited.

FREDERICK L. MATTESON, JR., *Primary Examiner.*
JOHN J. CAMBY, *Examiner.*